(12) United States Patent
Scott

(10) Patent No.: US 7,788,601 B2
(45) Date of Patent: Aug. 31, 2010

(54) METHOD OF SELECTING AN OBJECT

(75) Inventor: Johan Scott, Linköping (SE)

(73) Assignee: Nokia Corporation, Espoo (FI)

( * ) Notice: Subject to any disclaimer, the term of this patent is extended or adjusted under 35 U.S.C. 154(b) by 802 days.

(21) Appl. No.: 09/886,419

(22) Filed: Jun. 21, 2001

(65) Prior Publication Data

US 2002/0075315 A1  Jun. 20, 2002

(30) Foreign Application Priority Data

Jun. 30, 2000 (GB) ................................ 0016154.7

(51) Int. Cl.
*G06F 3/048* (2006.01)
(52) U.S. Cl. .................... 715/812; 715/822; 715/823
(58) Field of Classification Search .................. 345/758, 345/810, 158, 166, 159, 427; 703/13; 715/812
See application file for complete search history.

(56) References Cited

U.S. PATENT DOCUMENTS

| | | | | |
|---|---|---|---|---|
| 4,698,625 A | | 10/1987 | McCaskill et al. | 340/709 |
| 5,327,161 A | | 7/1994 | Logan et al. | 345/157 |
| 5,495,566 A | * | 2/1996 | Kwatinetz | 345/785 |
| 5,598,187 A | * | 1/1997 | Ide et al. | 345/158 |
| 5,745,738 A | * | 4/1998 | Ricard | 703/13 |
| 5,757,358 A | * | 5/1998 | Osga | 715/862 |
| 5,764,219 A | * | 6/1998 | Rutledge et al. | 345/159 |
| 5,786,805 A | * | 7/1998 | Barry | 345/159 |
| 5,805,165 A | | 9/1998 | Thorne, III et al. | 345/348 |
| 5,808,601 A | * | 9/1998 | Leah et al. | 715/856 |
| 5,860,861 A | * | 1/1999 | Lipps et al. | 463/36 |
| 5,870,079 A | * | 2/1999 | Hennessy | 345/159 |
| 5,874,941 A | * | 2/1999 | Yamada | 345/157 |
| 5,953,657 A | * | 9/1999 | Ghisler | 455/417 |
| 6,202,212 B1 | * | 3/2001 | Sturgeon et al. | 725/141 |
| 6,239,806 B1 | * | 5/2001 | Nishiumi et al. | 345/427 |
| 6,281,882 B1 | * | 8/2001 | Gordon et al. | 345/166 |
| 6,323,884 B1 | * | 11/2001 | Bird et al. | 715/810 |
| 6,435,969 B1 | * | 8/2002 | Tanaka et al. | 463/44 |
| 6,570,587 B1 | * | 5/2003 | Efrat et al. | 715/723 |

FOREIGN PATENT DOCUMENTS

| | | |
|---|---|---|
| GB | 2273857 | 6/1994 |
| GB | 2349057 | 10/2000 |
| WO | WO 95/09402 | 4/1995 |

OTHER PUBLICATIONS

PAJ Abstract vol. 008 No. 045 (P257) & JP 063311426 (20.12.88), Hitachi.
PAJ Abstract vol. 008 No. 045 (P257) & JP 058195939 (11.15.84), Canon.
European Search Report dated Mar. 1, 2001 for GB 0016154.7.

* cited by examiner

*Primary Examiner*—Boris Pesin
(74) *Attorney, Agent, or Firm*—Harrington & Smith

(57) ABSTRACT

Movement of a pointer or a window on a display of a personal computer, mobile telephone or digital television set, which allows an object to be selected, is controlled using an orthogonal set of keys. Motion of the pointer or window closely resembles the behaviour of a body of fixed mass obeying Newton's second law of motion. Movement of the pointer may used to predict which object the user wishes to select. Once a prediction has been made, the object is marked and the user may select the marked object, although the user need not act on the prediction.

34 Claims, 9 Drawing Sheets

METHOD OF SELECTING AN OBJECT

FIELD OF THE INVENTION

The present invention relates to a method of selecting an object.

BACKGROUND ART

A number of electronic devices have graphical user interfaces (GUIs). Such devices include, for example, personal computers (PCs), television sets and mobile telephones handsets. The user may interact with the device via the GUI using a user interface, for instance a touch sensitive pad, a keyboard, a mouse, a joystick or a remote control. Many factors determine the most appropriate choice of user interface for a device, such as ease and speed of operation and the environment in which the device is used. The use of a mouse is suited to the selection of icons when using a desk-top personal computer, however it is not so useful when used to make selections when using a digital television set. For this, a remote control unit having several keys is most convenient.

However, there are problems with using a key- or button-based control units as will now be explained with reference to digital television.

Digital television provides a variety of new services as compared with analogue television. It allows the user to transmit and receive signals via a set-top box and to interact with service providers. The user may now access the Internet in a similar way that is already available on a PC. For example, a user may navigate web pages by selecting hypertext links. The process of selecting a particular link involves moving a focus between links and activating a selection. In a PC-based system, this process is realised by positioning a mouse pointer over the link and pressing the mouse button. To indicate that the focus has moved to the link, the shape of the mouse pointer changes or the link is highlighted, for instance by changing colour or displaying a box around it.

The set-top box/television set system is often controlled using a remote control unit similar to that used with an existing analogue television. The remote control is usually provided with a set of dual-state arrow keys—up, down, right, left—allowing orthogonal movement about a menu or screen.

However, the remote control unit is not particularly suited to the selection of links in a web page using a pointer because it has fewer degrees of freedom than a mouse. Links may be positioned in such a way that the quickest way to reach them is by going diagonally across a viewing window. Furthermore, links may be sparsely separated and so repeated pressing of the keys is required to reach a link.

Moreover, the web page may be larger than the viewing window and so links may be located outside the viewing window.

The present invention seeks to solve these problems.

SUMMARY OF THE INVENTION

According to the present invention there is provided a method of selecting an object by controlling movement of a focus on a graphical display using an input device, the method comprising: supplying a signal from said input device; providing a set of acceleration data in dependence upon said signal; determining a position of the focus on the graphical display as a function of said data and displaying the focus at said position.

The method may further comprise determining an acceleration of the focus as a function of the data and determining a velocity of the focus in dependence upon the acceleration.

The method may further comprise determining in dependence upon the direction of motion of said focus whether said object is the intended destination of said focus and highlighting said object for selection. The determining may comprise defining a metric system.

The method may further comprise updating the acceleration using some or all of the data, updating the velocity and position of the focus and displaying the focus at the updated position. The method may further comprise determining whether the velocity of the focus exceeds a predefined maximum and if it does, limiting the velocity.

The supplying of a signal may comprise pressing a dual-state button.

The providing of a set of acceleration data may comprise adding a first set of acceleration data, which may be predefined, to a second set of acceleration data.

The determining of the velocity may comprise adding a first member of said first set of acceleration data to a previously determined velocity, which may be zero.

The focus may be a pointer, part of a page of content or a window.

According to the present invention there is provided electronic apparatus configured to carry out the method.

According to the present invention there is provided data processing apparatus configured to carry out the method.

According to the present invention there is provided a multimedia home product apparatus configured to carry out the method.

According to the present invention there is provided a personal computer apparatus configured to carry out the method.

According to the present invention there is provided a mobile telephone handset configured to carry out the method.

According to the present invention there is also provided a computer program to be loaded on data processing apparatus to select an object by controlling movement of an focus on a graphical display using an input device, such that the data processing device receives a signal from said input device; provides a set of acceleration data in dependence upon said signal; determines a position of the focus on the graphical display as a function of said data and displays the focus at said position on the graphical display.

According to the present invention there is also provided a method of selecting one of a plurality of objects on a graphical display using a focus, the method comprising supplying a signal to move the focus, determining a direction of motion of the focus, determining in dependence upon said direction of motion which of one of said plurality of objects is the intended destination of said focus and highlighting said object for selection.

The determining of which one of said plurality of objects is the intended destination may comprise determining which of said objects is closest to the focus and determining which of said objects substantially lies in the path of the direction of motion. The determining of which one of said plurality of objects is the intended destination may further comprise defining a metrics system.

According to the present invention there is also provided a computer program to be loaded on data processing apparatus to select one of a plurality of objects on a graphical display using a focus, such that the data processing apparatus receives a signal to move the focus, determines a direction of motion of the focus, determines in dependence upon said direction of motion which of one of said plurality of objects is the intended destination of said focus and highlights said object for selection.

According to the present invention there is also provided a method of selecting one of a plurality of objects on a graphical display using a focus, the method comprising: supplying a signal from an input device; providing a set of acceleration data in dependence upon said signal; determining a position of the focus on the graphical as a function of said data, displaying the focus at said position, determining in dependence upon the motion of said focus which of one of said plurality of objects is the intended destination of said focus and highlighting said object for selection.

According to the present invention there is also provided a method of controlling movement of an object on a graphical display using an input device, the method comprising: supplying a signal from said input device; providing a set of acceleration data in dependence upon said signal; determining a position of the object on the graphical display as a function of said data and displaying the object at said position.

BRIEF DESCRIPTION OF THE DRAWINGS

Embodiments of the present invention will now be described, by way of example, with reference to the accompanying drawings, in which:—

FIGS. 13a and 13b show a moving pointer;

PREFERRED EMBODIMENTS OF THE INVENTION

Movement of a Pointer 11

Figure 1:
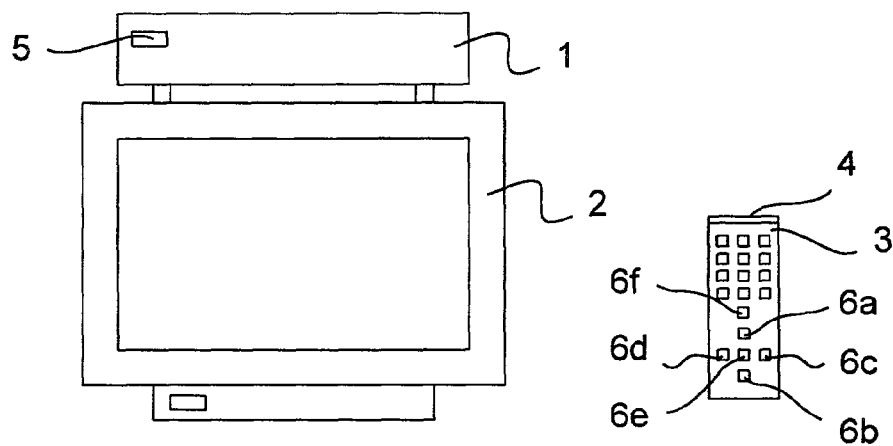
FIG. 1 shows a digital television system including a set-top box.

Referring to FIG. 1, a multimedia home product, for example a digital television set-top box 1, is connected to a display device in the form of a conventional television set 2. The set-top box 1 is controlled by a remote control unit 3 having an infrared transmitter 4. The set-top box 1 has an infrared receiver 5 for receiving signals from the remote control unit 3. The remote control unit 3 has up, down, right and left arrow keys 6a, 6b, 6c, 6d, a select button 6e and a "brake" button 6f, the function of which will be described in more detail later. In this case, up, down, right and left directions correspond to movement as seen on the television set 2.

The set-top box 1 comprises one or several input ports (not shown) including a port for a satellite antenna dish, a port for a terrestrial antenna, a port for a cable link and a port for a broadband internet connection and an output port (not shown) for connection to the television set. The set-top box 1 further comprises a microprocessor, memory, front-end tuner for filtering the signal, a video chip for rendering an image on the television set 2 and a user interface (not shown).

The set-top box 1 may be used to receive and decode digital television channels and transmit user information along a return channel. These channels are transmitted and received through a cable link, although links provided by satellite or terrestrial broadcast may also be used.

The set-top box 1 provides Internet services to the user, thus enabling the user to read e-mail and "surf the web". To access the web, the set-top box 1 loads and runs web browser software, for example a Mozilla web browser, which has been modified. The modification will be described in detail later.

Figure 2:
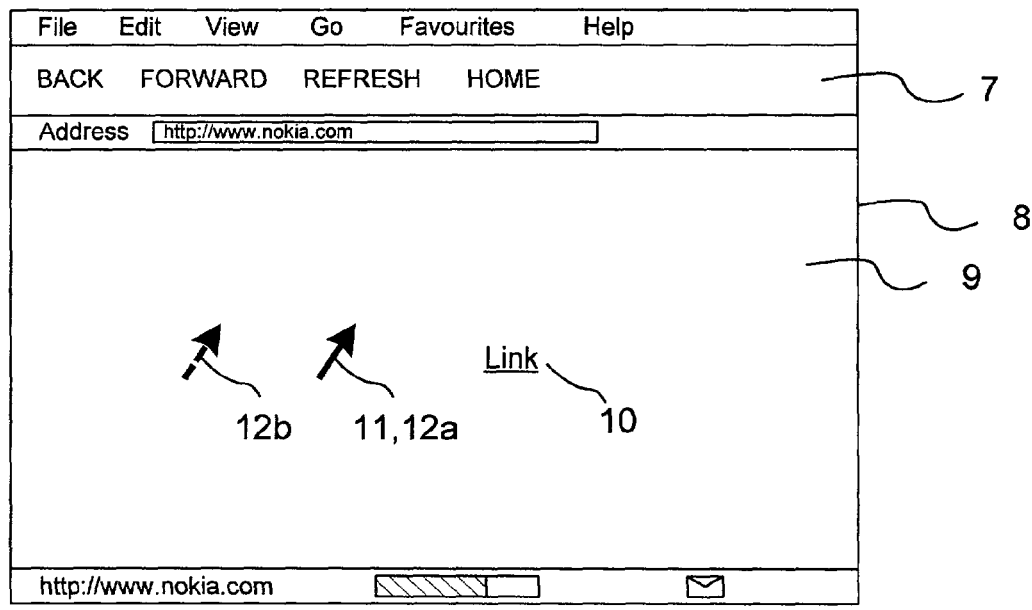
FIG. 2 is a schematic diagram of browser.

Referring to FIG. 2, a typical browser application 7 is shown. The browser application 7 includes a window 8 to view a content page 9. In this example, the content page 9 fits the window 8. The content page 9 comprises text and images and includes a hypertext link 10. A focus, in this example a pointer 11, is used to navigate around the content page 9 and desktop 7 including, for example accessing applications 9 and selecting the hypertext link 10.

The arrow keys 6a, 6b, 6c, 6d are used to control the pointer 11 whose motion is modelled on the motion of a physical body. In particular, the pointer 11 moves around the screen of the television set 2 in a manner similar to a body obeying Newton's second law of motion. A press of one of the arrow keys 6a, 6b, 6c, 6d is used to give the pointer 11 a push. Once pushed, the pointer 11 continues to glide across the window 8. Frictional forces may be included to slow the pointer 11 so that it eventually comes to a stop. Several pushes may be given to accelerate the pointer 11 to a high velocity. The 'brake' button 6f may also be used to slow the pointer 11. Thus, a press of an arrow key 6a, 6b, 6c, 6d amounts to adding a quantum of energy to the pointer 11, which is eventually "dissipated".

Newton's second law of motion states that the rate of change of linear momentum of a body is equal to the resultant force acting upon it and takes place in the direction of the force. This may expressed mathematically in terms of the mass, m, and velocity, v, of the body and the resultant force, F:

$$\frac{d(mv)}{dt} = F$$

The second law may be restated as the change of momentum of a body is equal to the product of the resultant force and the time for which it acts. This may be expressed as:

$$\Delta(mv) = F \Delta t$$

The product of force and time is known as impulse, I, and is equal to the change of momentum of the body. Thus, applying a force for a fixed duration of time results in a change of velocity. If this 'push' is repeated, then velocity of the body will increase. However, other forces, due to friction may compete and slow the body down.

In the following examples, movement of the pointer 11 closely resembles movement of a body of fixed mass as will now be described.

Referring again to FIG. 2, in a first example, the user wishes to select the link 10. The pointer 11 is located just to the left of the link 10 at a first position 12a. The user presses the right arrow key 6c once on the remote control unit 3. The pointer 11 accelerates to the right and begins to slow down until it stops about half way between the link 10 and the pointer's initial position 12a. The user again presses the right arrow key 6c and the pointer 11 acceleration again and gradually deaccelerates until it stops on top of the link 10. If the user thinks that the pointer 11 will not slow down enough and stop in time, they may press the 'brake' button 6f. Once the pointer 11 stops at the link 10 and the link 10 is highlighted, the user presses the 'select' button 6e and the link 10 is selected.

In a second example, the user wishes to select the link 10 again. However, the pointer 11 is located further to the left of the first position 12a at a second position 12b. The user presses the right arrow key 6c once. The pointer 11 starts to move quickly and begins to slow down. Before the pointer 11 has come to a stop, the user presses the right key 6c once more. The pointer 11 gains more speed, moving more quickly than it did when it started and begins to deaccelerate. Consequently, the pointer 11 covers ground much more quickly to begin with.

The maximum velocity of the pointer 11 may be limited to prevent overshoot and to ensure smooth movement of the pointer 11.

It will be appreciated that the other three arrow keys 6a, 6b, 6d operate in a similar fashion to control movement of the pointer 11 in the other three directions.

A method of controlling the pointer 11 according to the present invention will now be described. The browser software is modified to implement the method. It will be appreciated that the method may be implemented in other ways, for example as a mouse driver in any environment designed to use a mouse such as Microsoft Windows or Linux running a user environment such as KDE and GNOME or as a dedicated driver in an application. The latter implementation is useful where a system is not designed to use a mouse in the first place, such as this example.

The method comprises two processes. The first process is executed whenever a key is pressed, which could be every few seconds or so, and comprises updating a buffer holding values to be used in calculating a velocity, v, of the pointer 11. The second process is repeated every time a frame is updated on the display, for example every $1/50^{th}$ of a second. It comprises reading out a value from the buffer which is at the front of a queue and calculating the velocity, v, and position, p, of the pointer 11.

Figure 3:
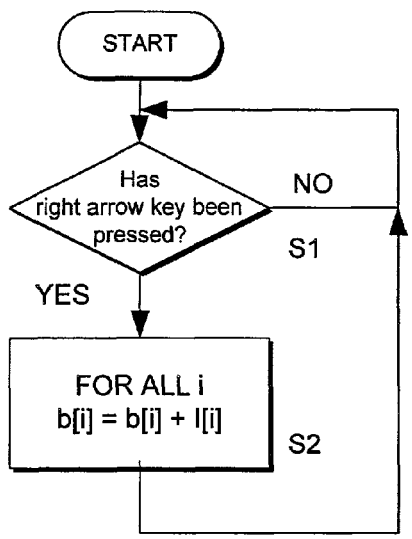
FIG. 3 is a flow diagram of the response of a browser to pressing an arrow key.

Referring to FIG. 3, the first process is described in more detail. The driver waits for the right arrow key 6c to be pressed (step S1). If the right arrow key 6c is pressed, a predefined impulse function I[x] is added to a horizontal acceleration buffer b[x] (step S2).

Figure 4:
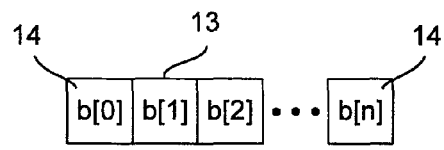
FIG. 4 is a schematic diagram of an acceleration buffer.
Figure 5:
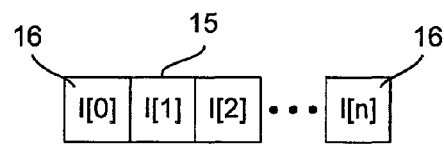
FIG. 5 is a schematic diagram of an impulse function.

Referring to FIGS. 4 and 5, the horizontal acceleration buffer b[x] comprises a string 13 of elements 14 each holding a signed value of acceleration. The sign of the value indicates the direction of acceleration. A positive value corresponds to acceleration from left to right. An element 14 may hold a value of zero. The impulse function I[x] comprises a string 15 of elements holding signed values of acceleration quanta 16. In this example, the acceleration buffer and the impulse function have the same number of elements, for example 5 or 10 elements.

Figure 6:
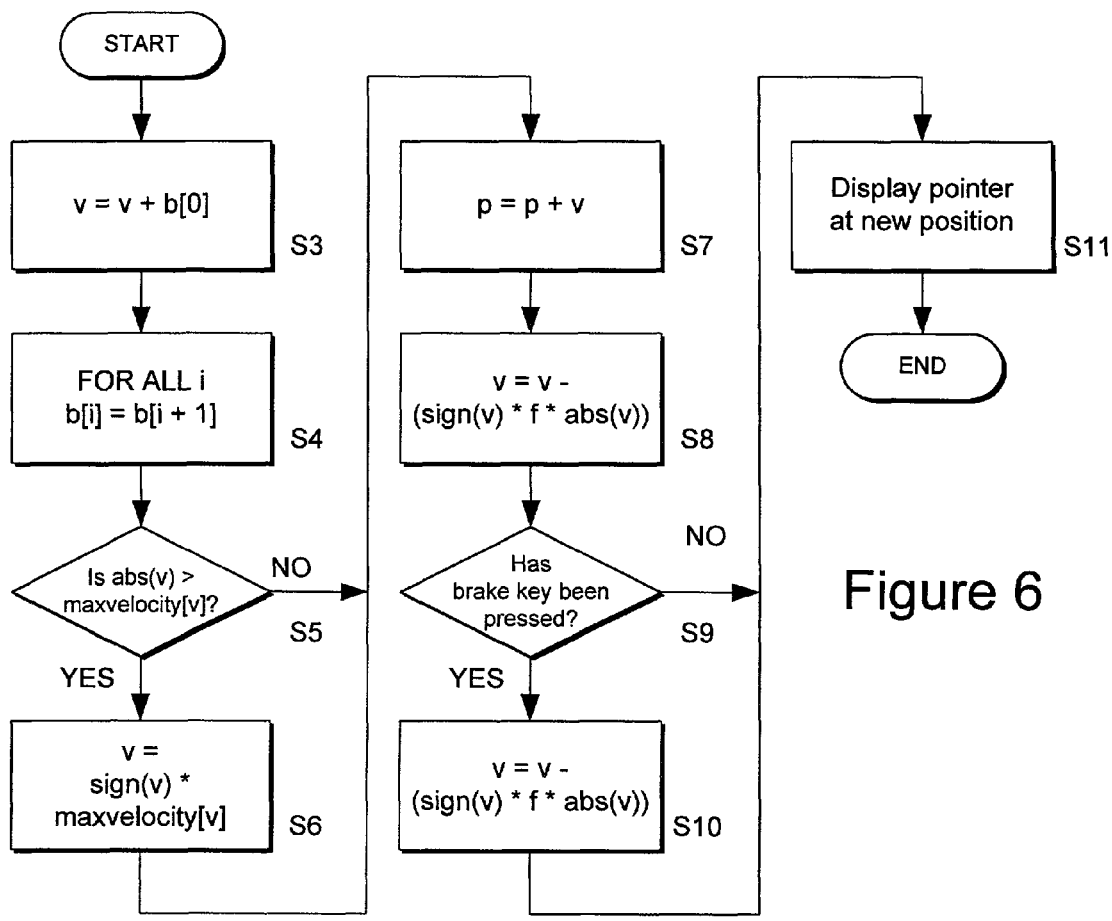
FIG. 6 is a flow diagram of updating the position of a pointer every frame.

Referring to FIG. 6, the second process is shown in which the position, p, of pointer 11 is updated every frame. The driver looks up the value at the beginning of the acceleration buffer string 13, namely the value stored at b[0], and adds it to a value of velocity, v, of the pointer 11 along the x-axis (step S3). If the pointer 11 is at rest, then v=0. The elements 14 within the acceleration buffer are shifted along by one, so that the value at the beginning of the string b[0] is removed and is replaced with the value previously held at b[1] (step S4). The element b[n] at the end of the string 13 is filled with a zero value. As a result, a new value is stored at b[0], ready for the next frame update. The velocity calculated at step S3 is checked to see whether it exceeds a predefined maximum (step S5). If it does, then the velocity of the pointer 11 along the x-axis is limited (step S6). The position is calculated by adding the value of velocity, v, to the value of position, p (step S7). The value of velocity is then adjusted for friction (step S8). Although, this will not be reflected in the position of the pointer 11 in this frame, it will affect it in the next frame. In this example, the velocity is reduced by v-sign(v)*f*abs(v), i.e. the velocity is reduced by a factor (1−f), where f is a constant of friction between 0 and 1 and v is the velocity. Other types of friction may be used, expressed as a constant or as a fraction of the velocity, for example v=v−sign(v)*min (abs(v), f). The process checks a buffer (not shown) to see if the 'brake' button 6f has been pressed (step S9). If it is detected that the 'brake' button 6f has been pressed since the last frame was displayed, then the velocity is reduced by a further factor (1−f) (step S10). Finally, the pointer 11 is displayed at its new position, p (step S11).

Figure 7:
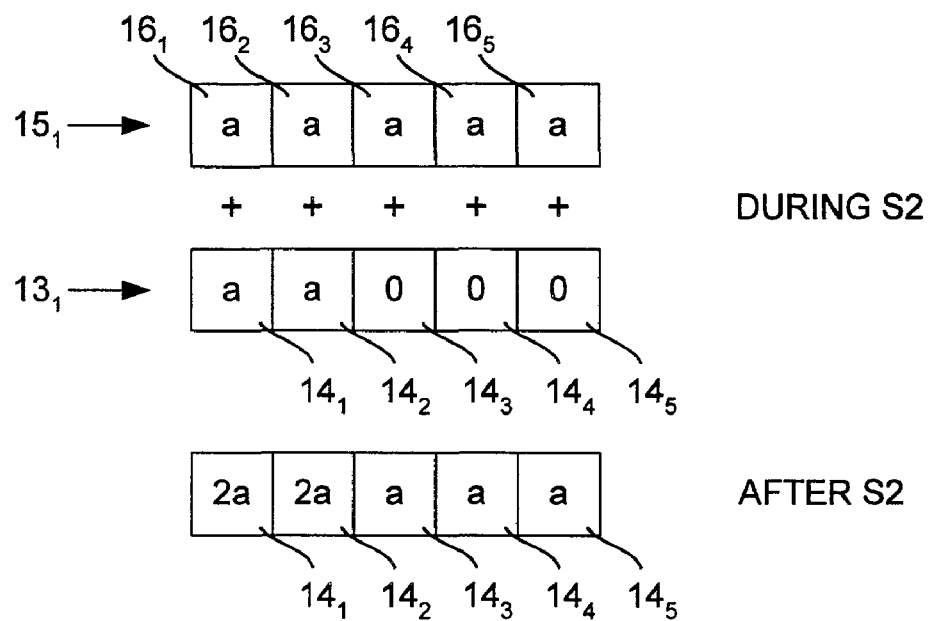
FIG. 7 illustrates addition of the contents of the impulse function to the acceleration buffer.

Referring to FIG. 7, a typical acceleration buffer string $13_1$ is shown having five elements $14_1$, $14_2$, $14_3$, $14_4$, $14_5$. The first and second elements $14_1$, $14_2$ hold values 'a' and the other elements $14_3$, $14_4$, $14_5$ hold value of zero. An example of an impulse function $15_1$ is shown having five elements $16_1$, $16_2$, $16_3$, $16_4$, $16_5$ each holding a value of 'a'. If a right arrow key 6c is pressed then the impulse function $15_1$ is added to the acceleration buffer string $13_1$ with the elements $14_1$, $14_2$, $14_3$, $14_4$, $14_5$ holding a new set of values.

Figure 8:
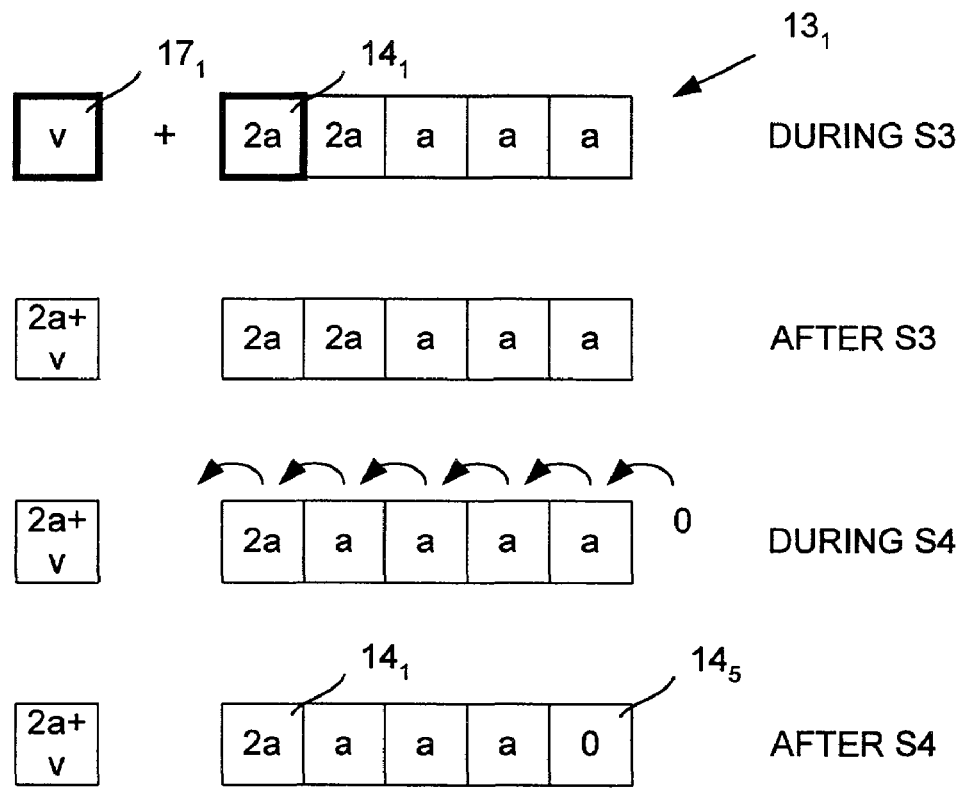
FIG. 8 illustrates calculation of the velocity of a pointer and updating the acceleration buffer.

In FIG. 8, the first two steps of calculating the velocity of the pointer 11 and updating the acceleration buffer $13_1$ are illustrated with respect to the example shown in FIG. 7. In this example, the addition of the impulse function $15_1$ to the acceleration buffer has just occurred. It will be appreciated that no such addition need have occurred since the last frame refresh. The value held in the first element $14_1$ of the acceleration buffer $13_1$ is added to a buffer $17_1$ holding the velocity of the pointer 11. This corresponds to step S3 as shown in FIG. 6. The values held in the elements of the acceleration buffer $13_1$ are shifted to the left. Thus, the fifth element $14_5$ holds a value of zero.

The predefined impulse function I[x] comprises one or more discrete values based upon an impulse conversion function. The impulse conversion function determines the rate at which the pointer 11 accelerates.

Figure 9:
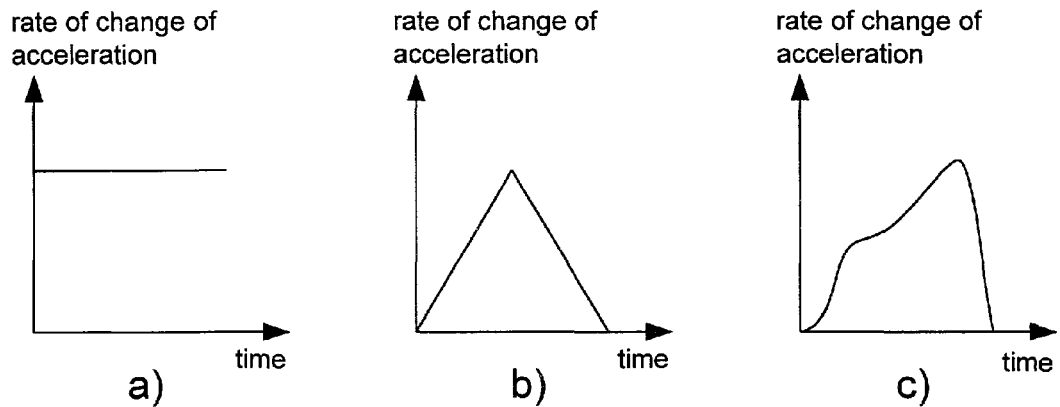
FIGS. 9a, 9b and 9c show different impulse conversion functions.

Referring to FIGS. 9a, 9b and 9c, three impulse conversion functions are illustrated. In FIG. 9a, the impulse conversion function is constant and a function of this shape was used in the example described with reference to FIG. 7. Other impulse conversion function shapes may be used including ones that are triangular as shown in FIG. 9b or one of a general shape as shown in FIG. 9c.

Figure 10:
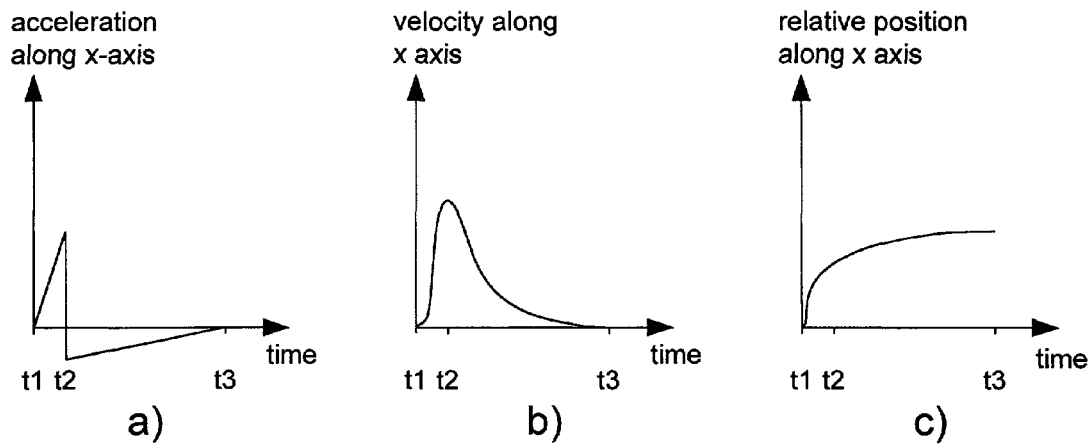
FIGS. 10a, 10b and 10c show acceleration, velocity and relative position of the pointer following a single arrow keystroke.

Referring to FIGS. 10a, 10b and 10c, the motion of the pointer 11 starting from rest following a single press of the right arrow key 6c is shown. In FIG. 10a, the acceleration of the pointer 11 is shown. Before time t1, when the key 6c is pressed, the acceleration buffer 16 is empty. At time t1, each element 14 of the buffer 16 is filled with the same value. Between time t1 and t2, the process described in FIG. 6 is repeatedly carried out. Each time a frame is refreshed, a further quantum of acceleration is added and so acceleration increase. The acceleration buffer 13 is purged of a non-zero value and is supplied with a zero value. After time t2, the acceleration buffer holds only zero values and so the acceleration becomes negative due to the influence of friction. The increasing acceleration and deacceleration is reflected in the velocity profile in FIG. 10b. Thus, movement of the pointer 11 is rapid at first, then slower and finally stops at time t3 as shown in FIG. 10c.

Figure 11:
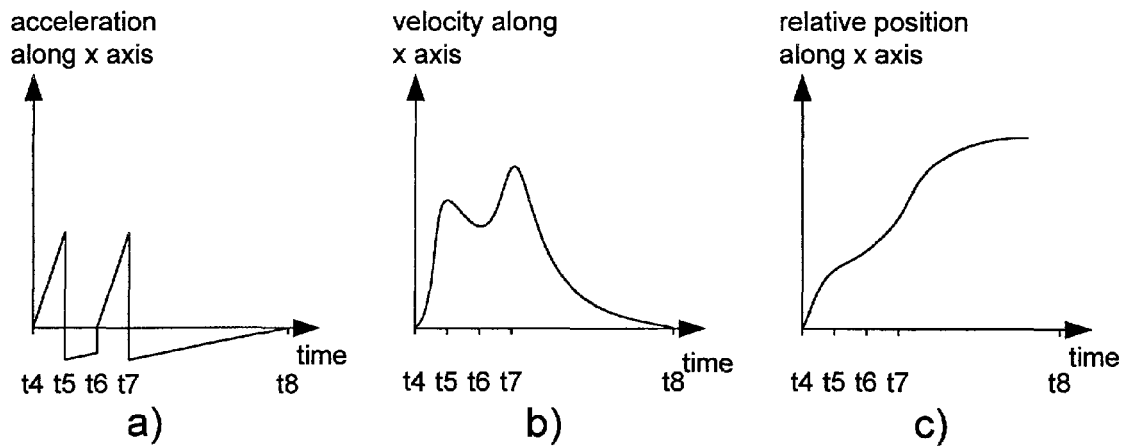
FIGS. 11a, 11b and 11c show acceleration, velocity and relative position of the pointer following two arrow keystrokes.

Referring to FIGS. 11a, 11b and 11c, the motion of the pointer 11 starting from rest following a double press of the right arrow key 6c is shown. Referring to FIG. 11a, the pointer 11 accelerates from time t4 after the key is pressed for the first time. At time t5, the pointer stops accelerating. However, a second key press at time t6 causes the pointer to start accelerating again until time t7. Eventually, the pointer comes to a stop at time t8.

It will be appreciated that the second keystroke may follow shortly after the first and before the acceleration buffer has been emptied. It will also be appreciated that further key strokes may used to move the pointer even more quickly.

Figures 12, 13:
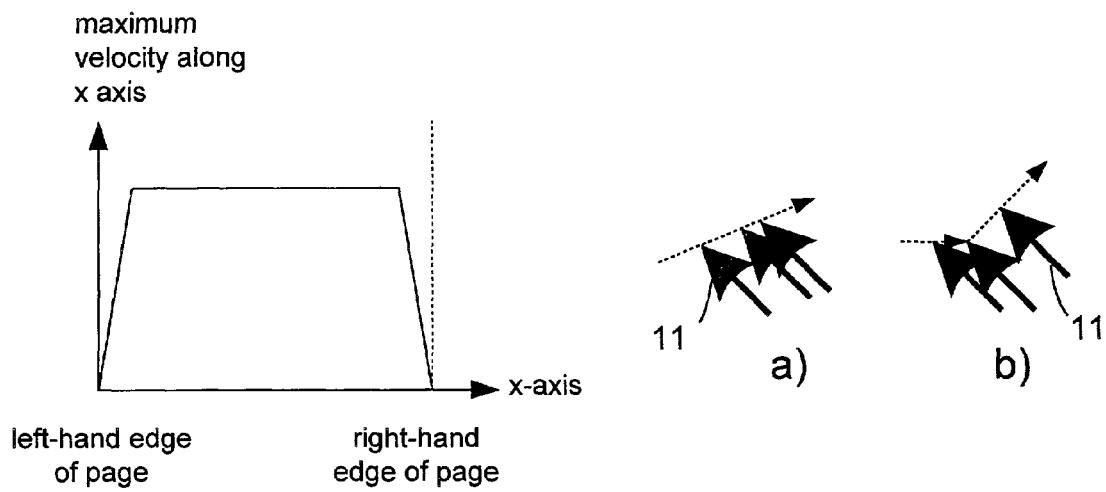
FIG. 12 shows the maximum allowable velocity of a pointer relative to its position on the contents page.

Referring to FIG. 12, the maximum velocity at which the pointer 11 is allowed to move is limited according to the position of the pointer 11 relative to the edge of the displayed page or content page. This is particularly useful when the method hereinbefore described is used in a web-browser to view a content page which is larger than the visible window. As the pointer approaches the edge of the content page, the maximum velocity is reduced. This allows the pointer 11 to move smoothly.

So far, only horizontal movement of the pointer has been described. However, vertical movement is also controlled independently using the same method. It will be appreciated that a separate, vertical acceleration buffer is used for movement of the pointer relative to the y-axis. The impulse function is the same to ensure uniform movement, although a different impulse function could be used.

Referring to FIGS. 13a and 13b, a combination of vertical control keys 6a, 6b and horizontal control keys 6c, 6d may be pressed to steer the pointer 11 in diagonal directions, as shown in FIG. 13a. Alternatively, the pointer 11 may begin moving in one direction, for example horizontally, and a vertical component may be added while the pointer 11 glides, to yield diagonal motion as shown in FIG. 13b. Thus, the pointer 11 is not constrained to move in the orthogonal directions defined by the arrow keys 6a, 6b, 6c, 6d.

Thus, this method of selecting a link has the advantage that the pointer 11 can be moved in directions other than those defined by the arrow keys 6a, 6b, 6c, 6b. Furthermore, the user does not need to keep pressing the keys 6a, 6b, 6c, 6d to move the pointer 11.

Predicting the Selectable Link 10

Figure 14:
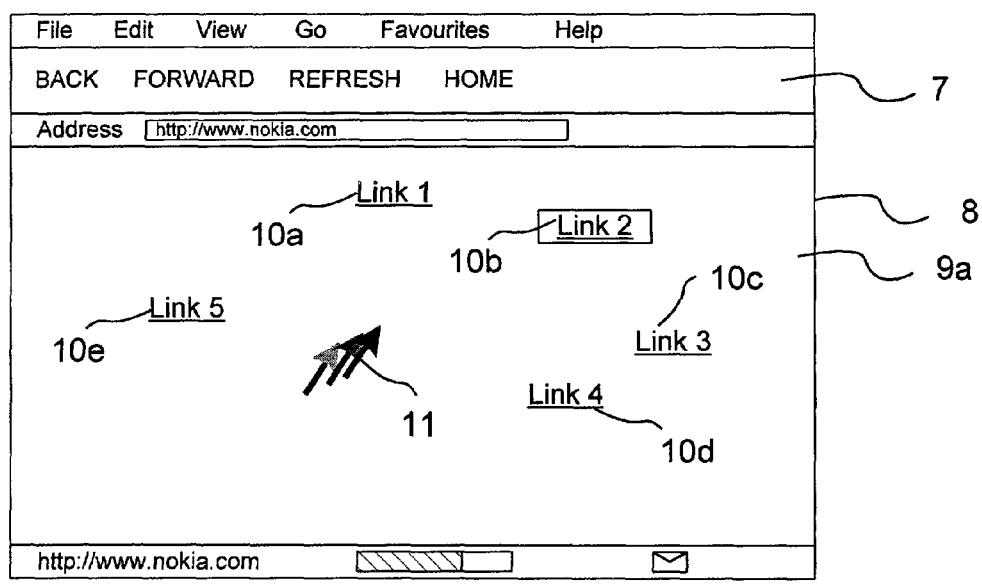
FIG. 14 shows a browser with a different set of links.

Referring to FIG. 14, the browser application 7 is used to view a content page 9a having first, second, third, fourth and fifth hypertext links 10a, 10b, 10c, 10d, 10e. The pointer 20 is controlled using the method hereinbefore described but modified to predict which link 10 the user wishes to select.

The user intends to select the second link 10b. The user begins to move the pointer 11 in the direction of the second link 10b. Based upon the initial movement of the pointer 11, the browser predicts which link 10 lies in the path of the direction of motion of the pointer 11 and is likely to be the intended link to be selected. In this case, the browser predicts that the user wishes to select the second link 10b and marks it as a selectable object in focus. If the 'select' button 6e is pressed, then the second link 10b is selected.

A method of anticipating selection of an object will now be described.

Figure 15:
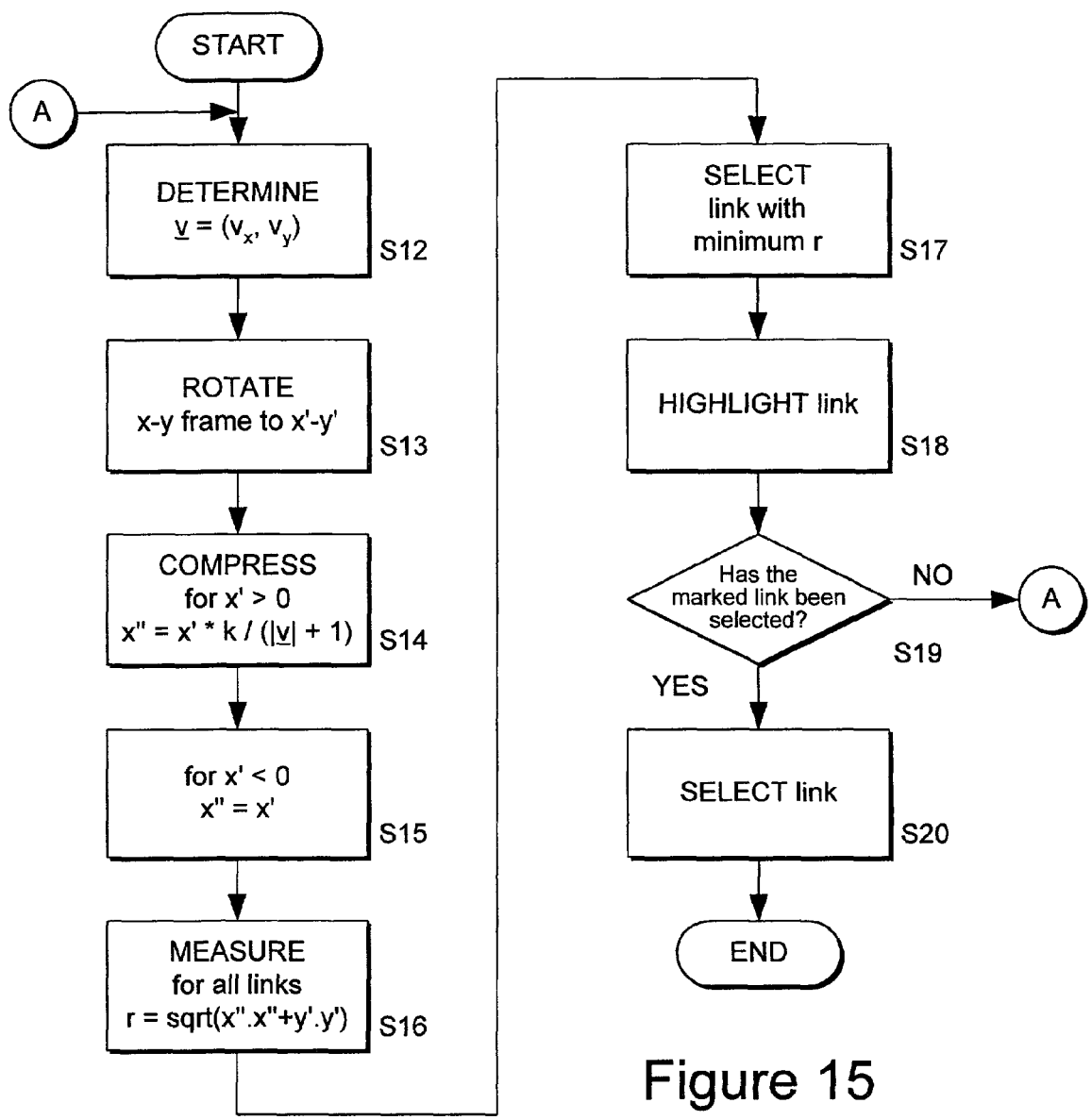
FIG. 15 is a flow diagram for predicting which link a user wishes to select.

Referring to FIG. 15, motion of the pointer 11 triggers calculation of a metric system. This may occur after step S11 in FIG. 6. The direction and speed of the pointer 11 is determined (step S12). The x-y co-ordinate system is rotated so that it aligned with the direction of motion of the pointer 11, so that in the rotated x'-y' co-ordinate system, the x' direction is parallel to the direction of motion, v (step S13). The rotated co-ordinate system is scaled in the x' direction by a compression factor $k/(|v|+1)$ for $x'>0$, where $|v|$ is the speed of the pointer 11 and k is scaling constant (step S14). The rotated co-ordinate system in not compressed in the y' direction (step S15). The distance between the pointer 11 and each link 10 is determined as a radius, r, (step S16) using the modified x"-y' co-ordinate system, such that:

$$r=\sqrt{(x'')^2+(y')^2}$$

Figure 16:
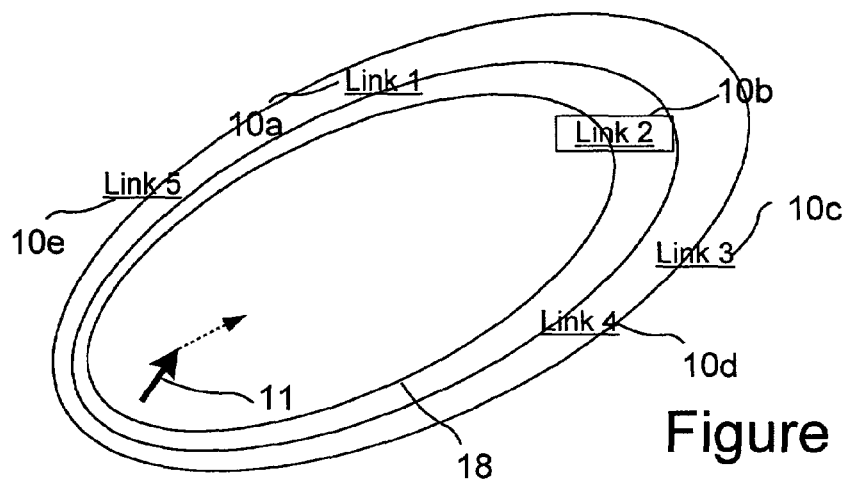
FIG. 16 illustrates a metrics system which is dependent on the direction and speed of a pointer.

Viewed in the x-y co-ordinate system, each measured radius for each link 10 traces a respective ellipse 18 as shown in FIG. 16. The link 10 having the smallest measured radius is marked as a selectable object by changing its colour or placing a box around it (steps S17 & S18). In this example, the second link 10b is marked. The system waits to see if the user selects the marked link 10b (step S19). If the user presses the mouse button or the 'select' button 6e then the marked link 10b is selected (step S20). Otherwise, the process returns to step S1 (FIG. 6) to update the update the motion of the pointer 11 and, based on a fresh set of motion parameters, make another prediction.

This provides another method of selecting an object. Although the pointer 11 has not reached the second link 10b, the second link 10b may nevertheless be selected. This has several advantages. For example, movement of the pointer 11 can be relatively coarse compared with the fine movements required to position it over a link 10. Furthermore, navigation about the content page 9 is quicker. However, the user may ignore the prediction and may move the pointer 11 to the same or another link 10 by further use of the keys 6 and once there, select it.

Movement of a Window 8 Over a Content Page 9

Single Viewing Window 8

Referring again to FIG. 14, the browser window 17 views only part of the web page 9a. The browser application 7 is modified to allow the arrow keys 6a, 6b, 6c, 6d to scroll the window 8 over the contents page 9a.

The browser application 7 is modified to operate in two modes. In a navigation mode, the user is able to move the pointer 11 about the window 8. However, if the pointer 11 is moved to the edge of the window 8, then the window 8 begins to scroll. Thus, if the pointer is moved to the right-hand edge of the window 8 and the pointer 11 is still moving or the user presses the right arrow key 6c then the window 8 moves to the right relative to the content page 9. In a viewing mode, the user is able to move the window 8 relative to the content page 9. No pointer 11 is displayed in the window 9 and no links may be selected. The viewing mode is useful for scanning a large page of content 9.

Figure 17:
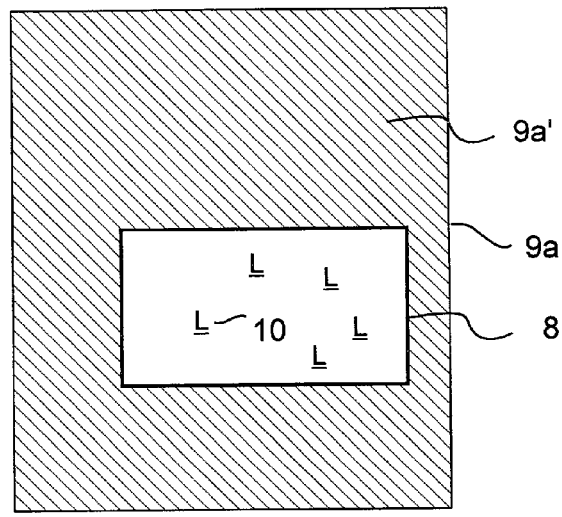
FIG. 17 is a schematic diagram of a contents page and a window viewing part of the contents page.

Referring to FIG. 17, a schematic diagram of the whole web page 9a' and the browser window 8 is shown. A portion of the page 9a' is not visible, as indicated by hatching. In the viewing mode, the window 8 may be moved relative to the page 9a tin order to reach other parts of the page 9a'. Movement of the window 8 relative to the contents page 9 is controlled using the method described with reference to FIGS. 1 to 13, except that rather than moving the pointer 11, objects within the contents page 18 are moved. The method is modified so that when the right arrow key 6c is pressed, the page 9 moves to the left and vice versa. Similarly, if the up arrow key 6a is pressed, the page 9 scrolls down and vice versa. The maximum velocity which the window 8 may move relative to the page 9 also varies as described with reference to FIG. 12. The friction component may be dispensed with by the removal of step S8 in FIG. 6. This has the advantage that the user is able to scroll the window 8 without having to keep pressing the arrow keys 6 on the remote control unit 3.

Multiple Viewing Windows 8

The browser application supports viewing of a plurality of windows 8, called frames, at the same time. Thus, the browser software is modified to the window 8 in focus to change from one window 8 to another.

Figure 18:
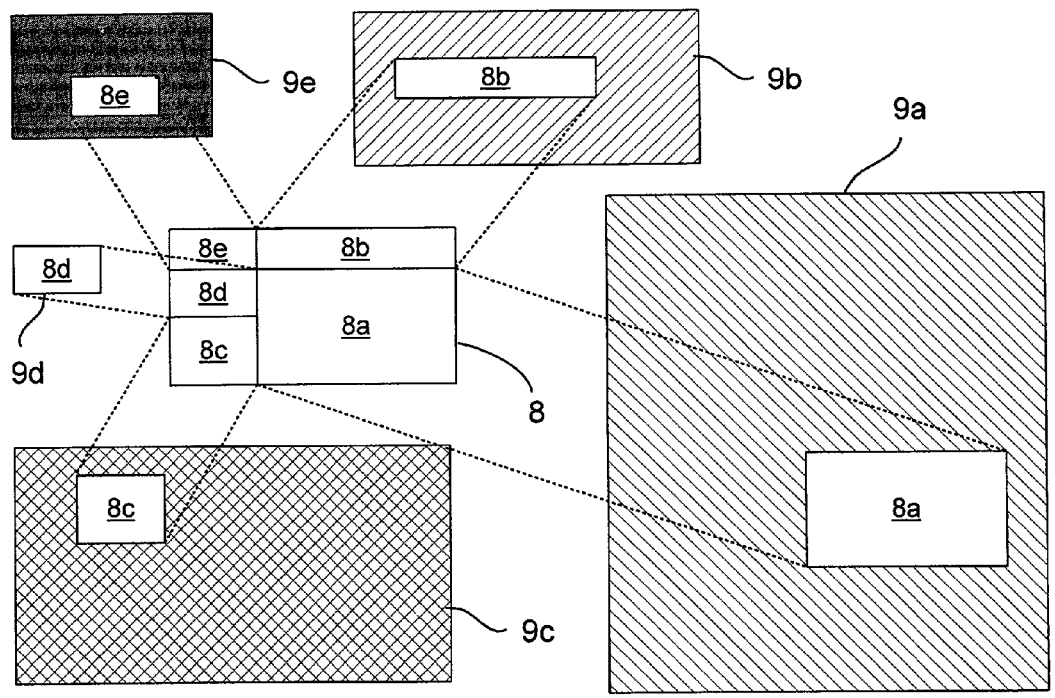
FIG. 18 is an exploded view of a browser window having a plurality of frames each viewing a respective content page.

Referring to FIG. 18, the viewing window 8 is split into first, second, third, fourth and fifth further viewing windows 8a, 8b, 8c, 8d, 8e, such as frames, each viewing content pages 9, 9b, 9c, 9c, 9d, 9e respectively. Focus may be switched between viewing windows 8 in one of two ways.

Figure 19:
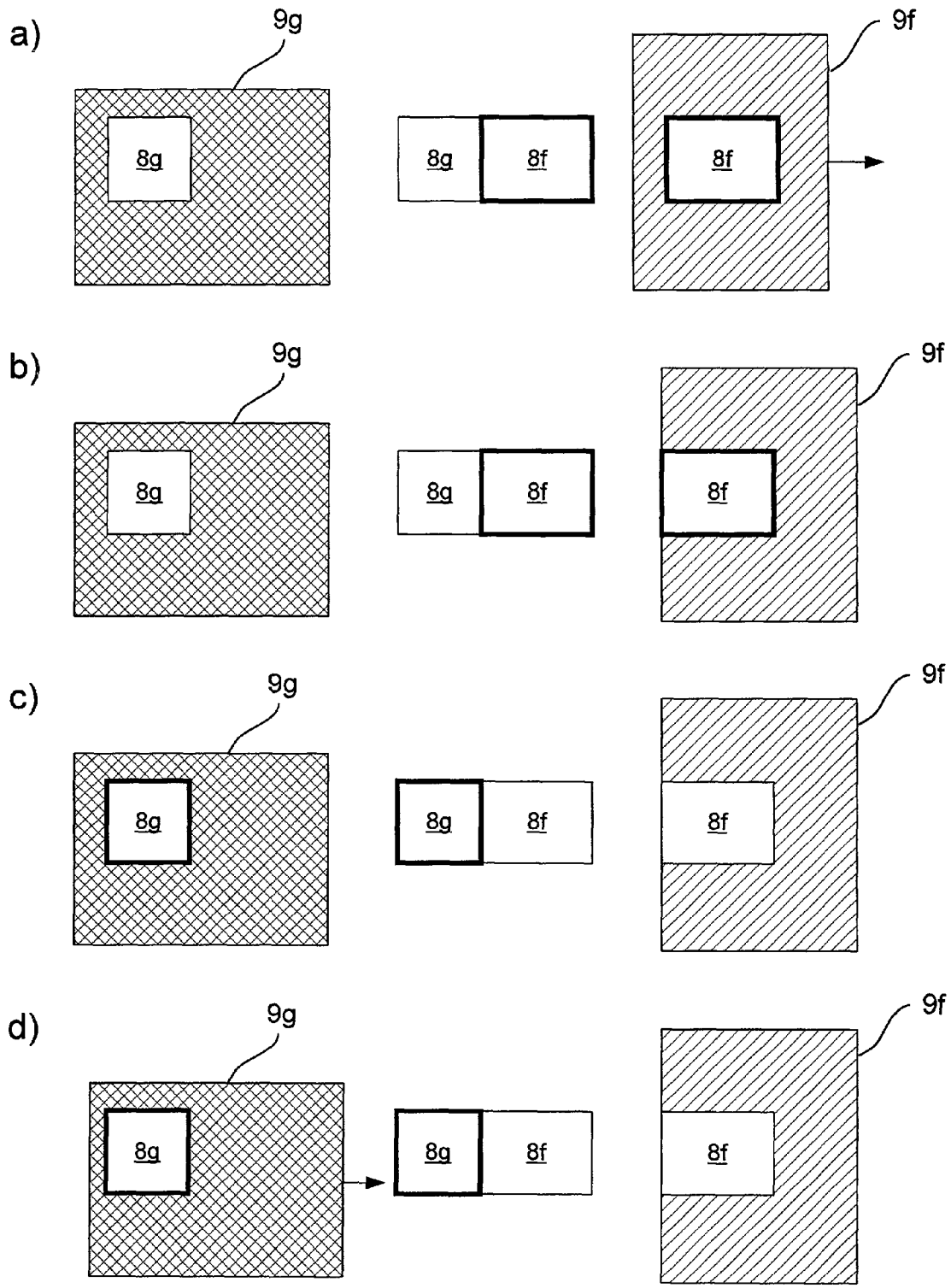
FIGS. 19a, 19b, 19c and 19d illustrates a change switching focus between two frames.

Referring to FIG. 19, the first way of switching the focus is explained in terms of switching focus from a sixth viewing window 8f to an adjacent seventh window 8g viewing respective sixth and seventh contents pages 9f, 9g. The sixth contents page 9f is scrolled towards the right by pressing the left arrow key 6d, as shown in FIG. 19a. When the left edge of the page 9f reaches the left edge of the sixth window 8f, as shown in FIG. 19b, and the user presses the right arrow key 6d a further predefined number of times, for example 3 times, the focus changes to the seventh window 8g as shown in FIG. 19c. The user can then scroll the seventh page 9g, as shown in FIG. 19d. If there are more than one adjacent windows, as shown in FIG. 18, where the focus can switch from the first window 8a to either the third or fourth windows 8c, 8d, one of the adjacent windows 8 may be selected according to a pre-defined set of rules.

A second way of switching between viewing windows is to switch to a frame selecting mode, by pressing a mode-switching key, and to use the arrow keys 6 to move from one window 8 to another. The window 8 in focus may be highlighted as having a border of a different colour. Depressing the mode-switching key allows scrolling of the selected window 8.

The methods of selecting links and moving windows may be applied to browser applications run on PCs and mobile telephone handsets. Furthermore, these methods may be used in any application, for example word processors such as Microsoft Word and desktop environments such as Windows.

Figure 20:
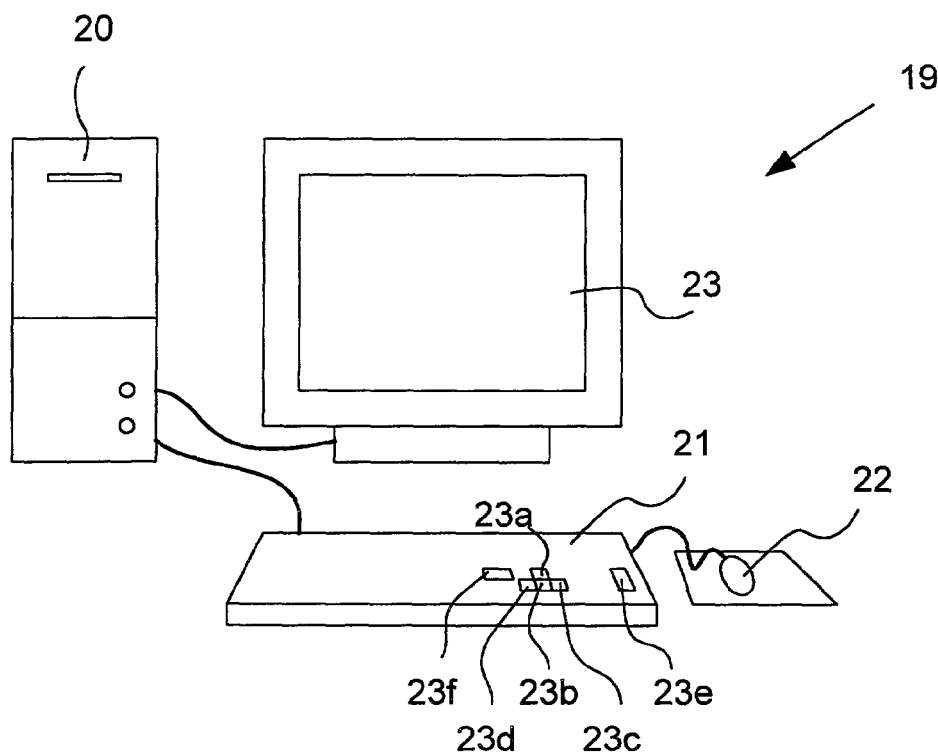
FIG. 20 shows a personal computer system.

Referring to FIG. 20, a personal computer system 19 comprises a hardware box 20, a keyboard 21, a mouse 22 and a monitor 23. The keyboard 21 includes up, down, right and left arrow keys 23a, 23b, 23c, 23d, an 'enter' key 23e and a 'shift' key 23f. The hardware box 20 houses a microprocessor, memory, a hard disk, a floppy disk drive, a CD-ROM drive and input/output ports for connection to a network and attachment of peripherals (not shown). The personal computer system 19 runs an operating system such as Microsoft Windows 95. A pointer or a cursor may be controlled using the keys 23 or the mouse 22. When the keys 23 are used to control the pointer any of the methods hereinbefore described may be used. If the mouse 22 is used, initial movement of the pointer or cursor may be used to predict which selectable object, such as a hypertext link or icon, the user wishes to select.

Figure 21:
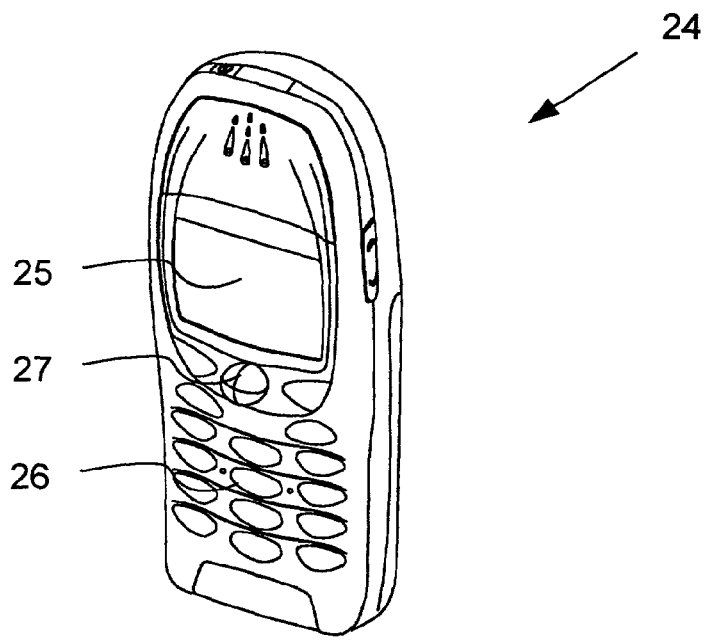
FIG. 21 shows a mobile telephone handset.

Referring to FIG. 21, a mobile telephone handset 24 is configured to load and run browser software and view the content page 9 on a display 25. A pointer or a window may be scrolled by used of a keypad 26 or a dedicated four-way roller button 27.

The invention claimed is:

1. A method comprising:
    receiving a signal from a dual-state button having a single depressed state, for moving a focus in a given direction on a graphical display;
    providing, in response to receiving said signal, predefined acceleration data for accelerating said focus in said given direction;
    determining a position of the focus on the graphical display as a function of said acceleration data;
    displaying the focus at said position on said display;
    determining a distance between the focus and an object as a radius using a co-ordinate system that is rotated and compressed in a direction of movement of said focus, where said co-ordinate system is rotated so that it becomes aligned with the direction of movement and where determining occurs during the movement of said focus; and
    if said object has a smallest determined radius, marking said object as a selected object.

2. A method according to claim 1, further comprising determining an acceleration of the focus as a function of acceleration data.

3. A method according to claim 2, further comprising determining a velocity of the focus in dependence upon the acceleration.

4. A method according to claim 2, further comprising updating the acceleration using some or all of the acceleration data, updating a velocity and position of the focus and displaying the focus at the updated position.

5. A method according to claim 1, further comprising determining whether a velocity of the focus exceeds a predefined maximum.

6. A method according to claim 5, further comprising limiting the velocity of the focus if it exceeds the predefined maximum.

7. A method according to claim 1, wherein said providing predefined acceleration data comprises adding a first set of acceleration data to a second set of acceleration data.

8. A method according to claim 7, further comprising predefining the first set of acceleration data.

9. A method according to claim 7, further comprising determining a velocity of the focus by adding a first member of said first set of acceleration data to a previously determined velocity.

10. A method according to claim 9, wherein the previously determined velocity is zero.

11. A method according to claim 1, wherein the focus is a pointer.

12. A method according to claim 1, wherein the focus is a part of a page of content.

13. A method according to claim 1, wherein the focus is a window.

14. A method according to claim 1, further comprising:
determining, in dependence upon said direction of movement, which one of a plurality of objects is an intended destination of said focus; and
highlighting said one object for selection, where the highlighting is accomplished without the focus reaching the intended destination.

15. A method according to claim 14, wherein the determining of which one of said plurality of objects is the intended destination comprises determining which of said objects is closest to the focus.

16. A method according to claim 14, wherein the determining of which one of said plurality of objects is the intended destination comprises determining which of said objects substantially lies in a path of the direction of movement.

17. A method according to claim 14, wherein the determining of which one of said plurality of objects is the intended destination further comprises defining a metrics system.

18. A method according to claim 1 wherein providing predefined acceleration data for accelerating said focus in said given direction comprises adding at least one data value to a buffer of acceleration data values.

19. A method according to claim 1, wherein providing predefined acceleration data for accelerating said focus in said given direction comprises updating a buffer of acceleration data values.

20. A method according to claim 19, comprising reading out a data value at a front of said buffer and calculating a velocity and a position of said focus using said data value.

21. A method according to claim 19, wherein said buffer is updated whenever a signal from said dual-state button is received.

22. A method according to claim 21, wherein reading said data value and calculating said velocity and said position is repeated every time a frame on said display is updated.

23. A method according to claim 1, wherein said acceleration data is in a form of impulse data.

24. A method according to claim 3, wherein determining said velocity comprises adjusting said velocity for friction so as to reduce said velocity.

25. A method according to claim 1, further comprising:
receiving an other signal from a second dual-state button having a single depressed state, for moving the focus in an other, different given direction;
providing, in response to receiving said other signal, other predefined acceleration data for accelerating said focus in said other, different given direction; and
determining a position of the focus on the graphical display as a function of said other predefined acceleration data.

26. A method according to claim 25, wherein providing predefined acceleration data for accelerating said focus in said different given direction comprises adding at least one data value to an other, different buffer of acceleration data values.

27. A method according to claim 1, comprising:
determining, in response to accelerating said focus, a maximum velocity of the focus, where the maximum velocity is reduced as the focus approaches an edge of the graphical display.

28. A method according to claim 1, further comprising a first mode wherein the display begins to scroll if the focus is moved to the edge of the display; and a second mode wherein the display is moved relative to the object.

29. A method according to claim 1, further comprising compressing said co-ordinate system in the direction of movement by a compression factor $k/(|v|+1)$, where $|v|$ is a speed of the focus and k is a scaling constant.

30. Apparatus comprising:
at least one processor; and
at least one memory including computer program code, where the at least one memory and the computer program code are configured, with the at least one processor, to cause the apparatus to at least:
output an image to a graphical display;
receive a signal from a dual-state button having a single depressed state for moving a focus in a given direction on a graphical display;
provide, in response to receiving said signal, predefined acceleration data for accelerating said focus in said given direction;
determine a position of the focus on the graphical display as a function of said acceleration data;
cause the interface to display the focus at said position on said display;
determine a distance between the focus and an object as a radius using a co-ordinate system that is rotated and compressed in a direction of movement of said focus, where said co-ordinate system is rotated so that it becomes aligned with the direction of movement and where determining occurs during the movement of said focus; and
if said object has a smallest determined radius, to mark said object as a selected object.

31. Apparatus according to claim 30, comprising the at least one memory and the computer program code are configured, with the at least one processor, to cause the apparatus to determine in response to accelerating said focus, a maximum velocity of the focus, where the maximum velocity is reduced as the focus approaches an edge of the graphical display.

32. Apparatus according to claim 30, embodied in one of a computer and a multimedia home product.

33. Apparatus according to claim 30, embodied in a mobile telephone handset.

34. A computer-readable medium storing instructions, which when executed by a computer, causes the computer to perform operations comprising:
receiving a signal from a dual-state button having a single depressed state for moving a focus in a given direction on a graphical display,
providing, in response to receiving the signal, predefined acceleration data for accelerating said focus in a given direction,
determining a position of the focus on the graphical display as a function of said acceleration data;
displaying the focus at said position on said display;
determining a distance between the focus and an object as a radius using a co-ordinate system that is rotated and compressed in a direction of movement of said focus, where said co-ordinate system is rotated so that it becomes aligned with the direction of movement and where determining occurs during the movement of said focus; and
if said object has a smallest determined radius, to mark said object as a selected object.

* * * * *